(12) United States Patent
Qian et al.

(10) Patent No.: US 11,808,667 B2
(45) Date of Patent: Nov. 7, 2023

(54) WING MODEL FOR STATIC AEROELASTICITY WIND TUNNEL TEST

(71) Applicant: Dalian University of Technology, Dalian (CN)

(72) Inventors: Wei Qian, Dalian (CN); Ling Xiao, Dalian (CN); Xing Li, Dalian (CN); Shaojie Ge, Dalian (CN); Weizhe Feng, Dalian (CN); Xinyu Ai, Dalian (CN)

(73) Assignee: Dalian University of Technology, Dalian (CN)

( * ) Notice: Subject to any disclaimer, the term of this patent is extended or adjusted under 35 U.S.C. 154(b) by 227 days.

(21) Appl. No.: 17/532,305

(22) Filed: Nov. 22, 2021

(65) Prior Publication Data
US 2022/0187159 A1 Jun. 16, 2022

(30) Foreign Application Priority Data

Dec. 16, 2020 (CN) .......................... 202011487843.0

(51) Int. Cl.
*G01M 9/08* (2006.01)
(52) U.S. Cl.
CPC ..................................... *G01M 9/08* (2013.01)
(58) Field of Classification Search
CPC .......... G01M 9/04; G01M 9/06; G01M 9/062; G01M 9/02; G01M 9/08; G01M 9/065; G01M 9/067; G01M 17/007; G01M 9/00; G01M 10/00; G01M 15/02; G01M 17/0074; G01M 17/0072; G01M 99/00; G01M 1/22; G01M 15/14; G01M 17/00; G01M 5/0016; G01M 5/0066; G01M 1/122; G01M 1/28; G01M 1/30; G01M 1/36; G01M 11/083; G01M 11/088; G01M 13/027; G01M 17/0076; G01M 17/013; G01M 3/181; G01M 3/2838; G01M 5/0033; G01M 5/005; G01M 5/0083; G01M 7/02; G01M 7/022;
(Continued)

(56) References Cited

U.S. PATENT DOCUMENTS 11,691,763 B2 * 7/2023 Qian ....................... G06F 30/10
701/3

FOREIGN PATENT DOCUMENTS

CN 106289680 A * 1/2017
CN 108303227 A * 7/2018
(Continued)

*Primary Examiner* — Andre J Allen
(74) *Attorney, Agent, or Firm* — Whiteford, Taylor & Preston, LLP; Peter J. Davis

(57) ABSTRACT

A wing model for static aeroelasticity wind tunnel test belongs to the technical field of aeroelasticity tests. In the wing model, the model steel joint and the spar frame are connected with the composite material skin. The piezometer wing ribs are arranged among the spar frame and the plurality of supporting wing ribs. The embedded piezometer tubes are arranged in the piezometer wing ribs, the lightweight filling foam is arranged among the spar frame and the plurality of supporting wing ribs. An outer surface of a frame segment formed by the lightweight filling foam, the plurality of supporting wing ribs, the piezometer wing ribs and the spar frame is covered with the composite material skin. The frame segment is assembled on the model steel joint to form the wing model for the static aeroelasticity wind tunnel test.

7 Claims, 3 Drawing Sheets

(58) Field of Classification Search
CPC .......... G01M 7/025; G01M 7/04; G01M 7/08;
G01M 99/002; G01M 99/004; G01M
11/30; G01M 13/00; G01M 3/20; G01M
3/202; G01M 5/00; G01M 5/0008; G01L
5/1627; G01L 19/0007; G01L 19/0015;
G01L 11/02; G01L 5/16; G01L 5/12;
G01L 5/133; G01L 5/162; G01L 5/161;
G01L 9/08; G01L 15/00; G01L 23/12;
G01L 23/125; G01L 5/168; G01L 9/0051;
G01L 9/065; G01L 1/24; G01L 19/0636;
G01L 19/0654; G01L 19/147; G01L
23/10; G01L 27/00; G01L 5/167; G01L
7/00; G01L 1/086; G01L 1/148; G01L
1/16; G01L 1/2206; G01L 1/2243; G01L
1/2268; G01L 1/26; G01L 11/04; G01L
13/02; G01L 19/00; G01L 19/003; G01L
19/0038; G01L 19/04; G01L 19/08; G01L
19/148; G01L 27/005; G01L 5/163; G01L
5/164; G01L 7/18; G01L 9/00; G01L
9/0002; G01L 9/0035; G01L 9/006; G01L
9/007; G01L 9/0077; G01L 9/10; G01L
9/12; G01L 1/2262; G01L 19/149; G01L
7/024
USPC .......................................................... 73/147
See application file for complete search history.

(56) References Cited

FOREIGN PATENT DOCUMENTS

| | | | |
|---|---|---|---|
| CN | 110162817 A | * | 8/2019 |
| CN | 112304564 A | * | 2/2021 |
| CN | 114858407 A | * | 8/2022 |
| JP | H0727665 A | * | 1/1995 |
| RU | 2083967 C1 | * | 7/1997 |

* cited by examiner

WING MODEL FOR STATIC AEROELASTICITY WIND TUNNEL TEST

CROSS REFERENCE TO RELATED APPLICATION

This application claims the priority of Chinese Patent Application No. 202011487843.0, entitled "Wing Model for Static Aeroelasticity Wind Tunnel Test" filed with the Chinese Patent Office on Dec. 16, 2020, which is incorporated herein by reference in its entirety.

TECHNICAL FIELD

The disclosure relates to the technical field of aeroelasticity test, and in particular to a wing model for a static aeroelasticity wind tunnel test capable of force and pressure measurement.

BACKGROUND ART

Traditional wing models for static aeroelasticity wind tunnel tests generally do not have a pressure measurement capability, and there is no specific accuracy requirement for the profile of the wing models. Furthermore, the models are only used to research the static aeroelasticity property, and do not have the capability of measuring real-time pressure distribution data during the wind tunnel test. However, with the continuous development of the high aspect ratio wing technology, the static aeroelasticity effect has become more prominent, and researchers have increasing requirements for the accuracy of aerodynamic data. By measuring the real-time pressure distribution data of the static aeroelasticity model during the wind tunnel test, it is possible to better research the static aeroelasticity problems including torsion divergence, load redistribution and the like, caused by the static aeroelasticity on the higher aspect-ratio wing. Also, it provides a good correction for the aerodynamic force and improves the calculation accuracy of the aerodynamic force.

SUMMARY

The present disclosure provides a wing model for a static aeroelasticity wind tunnel test, in view of the development of the high-aspect-ratio wing technology, so that a change of pressure distribution on a required wing section can be measured in real time during the static aeroelasticity wind tunnel test. The wind model realizes an integration of force and pressure measurement, and obtain accurate aerodynamic data when the wing model is deformed under force.

The present disclosure provides the following technical solutions: a wing model for a static aeroelasticity wind tunnel test, including a model steel joint, a spar frame, a composite material skin, lightweight filling foam, a plurality of supporting wing ribs, two piezometer wing ribs, embedded piezometer tubes, and piezometer wires. The model steel joint and the spar frame are connected with the composite material skin. The spar frame is of structure having two main beams and a single auxiliary beam. The piezometer wing ribs are arranged among the spar frame and the plurality of supporting wing ribs. The embedded piezometer tubes are arranged in the piezometer wing ribs. The lightweight filling foam is arranged among the spar frame and the plurality of supporting wing ribs. An outer surface of a frame segment formed by the lightweight filling foam, the plurality of supporting wing ribs, the piezometer wing ribs and the spar frame is covered with the composite material skin, and the frame segment is assembled on the model steel joint to form the wing model for the static aeroelasticity wind tunnel test.

The embedded piezometer tubes pass through piezometer holes reserved in the composite material skin on the piezometer wing ribs and are bonded to a lower surface of the composite material skin, and connected to the piezometer wires. The piezometer wires are led out from an inside of the wing model through wire holes reserved in the supporting wing ribs and the lightweight filling foam.

The composite material skin is made from an aluminum mold processed by numerical control machining.

The piezometer wing ribs are located among the supporting wing ribs, and formed into a segmented structure adapted to the spar frame.

The embedded piezometer tubes are loaded in the piezometer wing ribs for positioning wing sections and fixing the embedded piezometer tubes.

A plurality of piezometer steel tubes of the embedded piezometer tubes are arranged on upper and lower surfaces of the wing to form a complete piezometer section.

The embedded piezometer tubes pass through piezometer holes reserved on the composite material skin, and are directly communicated with surroundings to measure an external pressure in real time. The directions of the piezometer holes are a normal direction of the piezometer section.

The embodiments have the following technical effects: in the wing model for a static aeroelasticity wind tunnel test, the model steel joint and the spar frame are connected with the composite material skin. The spar frame is of structure having two main beams and a single auxiliary beam. The piezometer wing ribs are arranged among the spar frame and the plurality of supporting wing ribs, the embedded piezometer tubes are arranged in the piezometer wing ribs. The lightweight filling foam is arranged among the spar frame and the plurality of supporting wing ribs. An outer surface of a frame segment formed by the lightweight filling foam, the plurality of supporting wing ribs, the piezometer wing ribs and the spar frame is covered with the composite material skin. The frame segment is assembled on the model steel joint to form the wing model for the static aeroelasticity wind tunnel test. The wing model for a static aeroelasticity wind tunnel test has high-precision aerodynamic shape and high-strength loading capacity. The changes in the pressure distribution of the required wing section can be measured in real time during the wind tunnel test. The wing model realizes the integration of force and pressure measurement of the static aeroelasticity model, and obtain accurate aerodynamic data when the wing model is deformed under force.

List of reference numbers: 1 model steel joint; 2 spar frame; 3 composite material skin; 4 lightweight filling foam;

5 supporting wing rib; 6 first piezometer wing rib; 6a second piezometer wing rib; 7 embedded piezometer tube; and 8 piezometer wire.

DETAILED DESCRIPTION OF THE EMBODIMENTS

The structure of the disclosure will be further described below with reference to the drawings.

Figure 1:
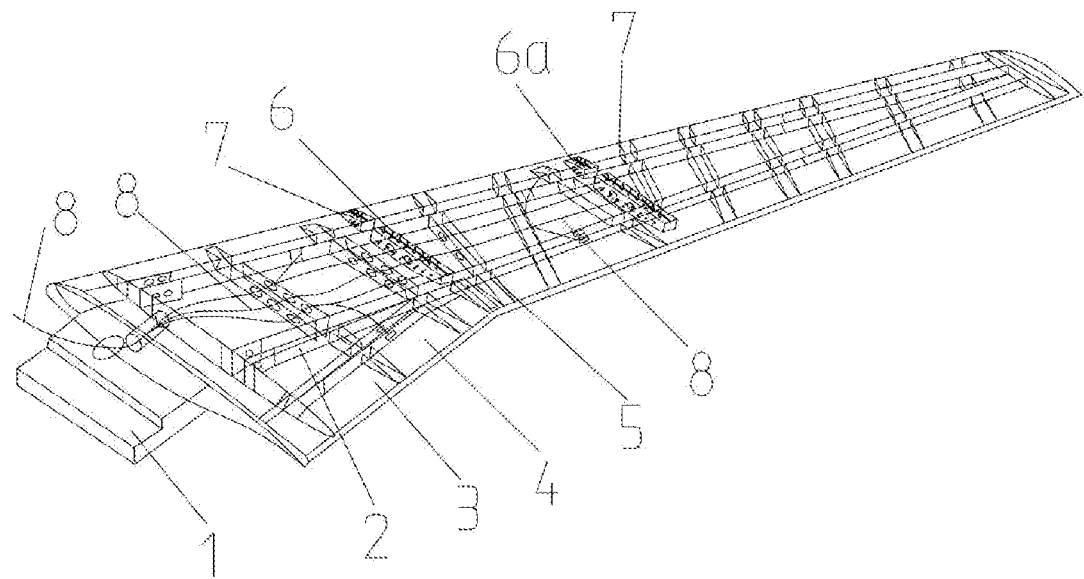
FIG. 1 is a schematic structural diagram of a wing model for a static aeroelasticity wind tunnel test integrated with force and pressure measurement.
Figure 2:
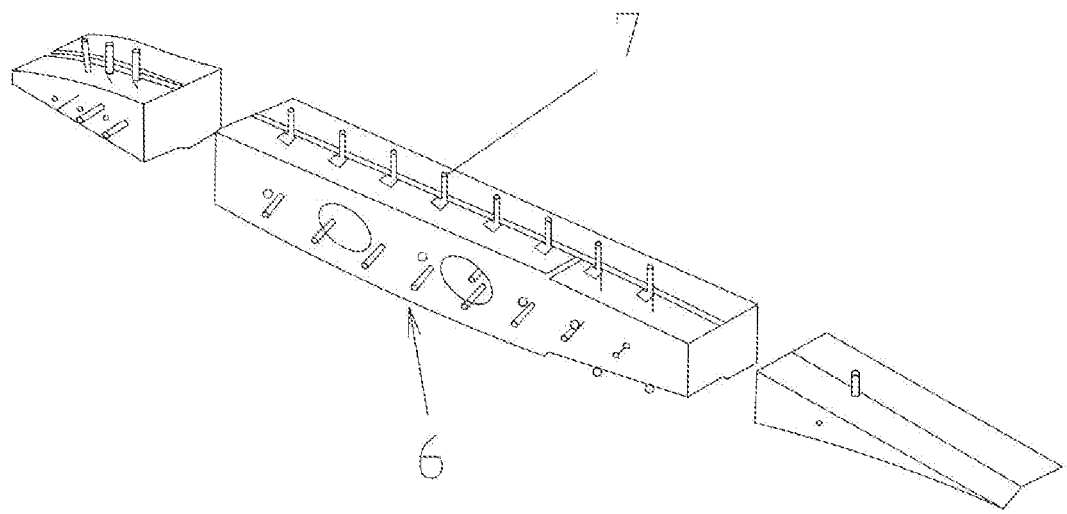
FIG. 2 is a schematic structural diagram of a first piezometer wing rib.
Figure 3:
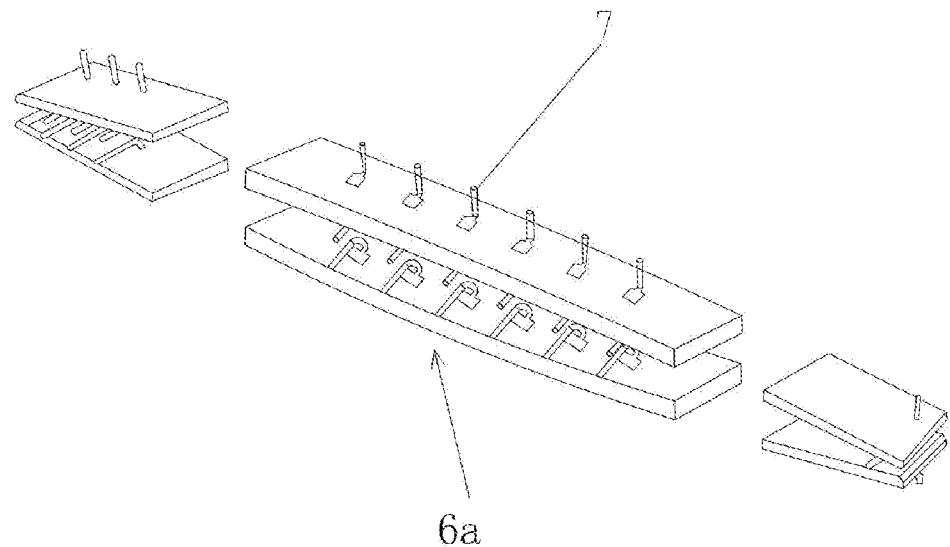
FIG. 3 is a schematic structural diagram of a second piezometer wing rib.
Figure 4:
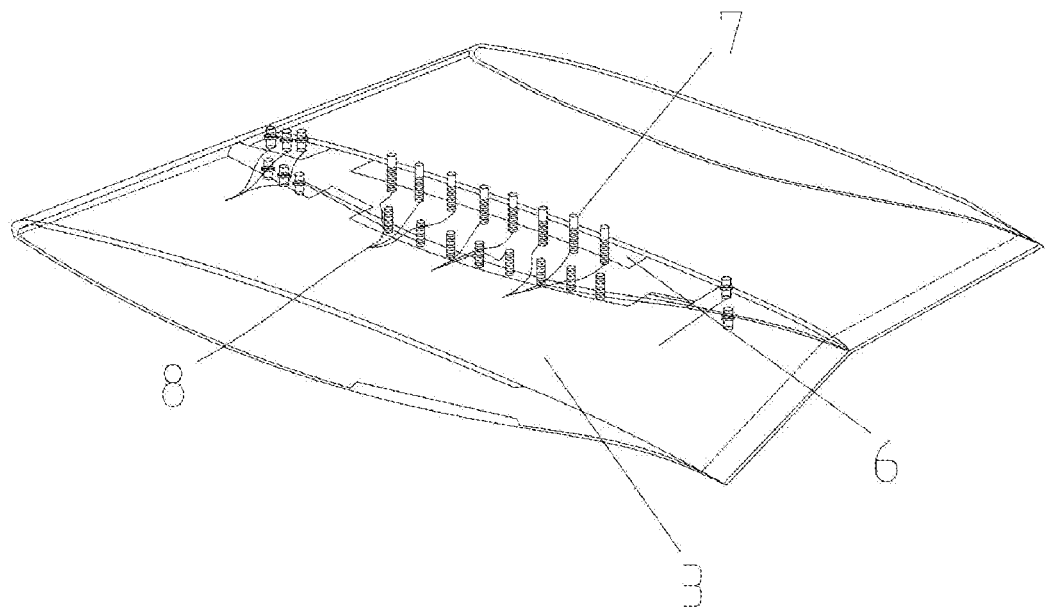
FIG. 4 is a schematic structural diagram of assembled piezometer tubes.
Figure 5:
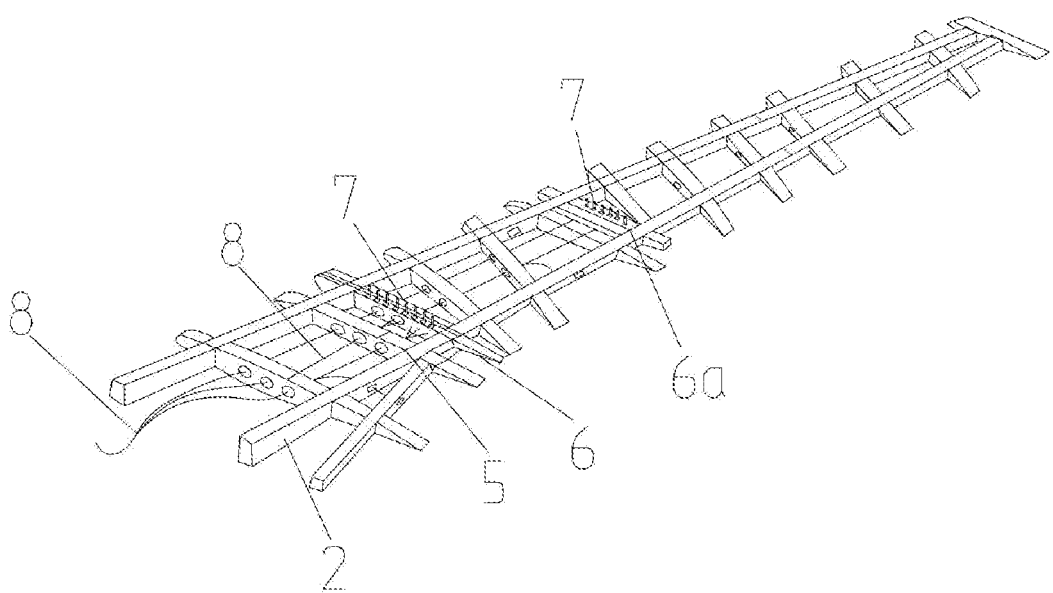
FIG. 5 is a schematic diagram of piezometer wires leading out from an inside of a wing through supporting wing ribs.

FIGS. 1, 4 and 5 show a schematic structural diagram of a wing model for a static aeroelasticity wind tunnel test. In the figures, the wing model for a static aeroelasticity wind tunnel test includes a model steel joint 1, a spar frame 2, a composite material skin 3, lightweight filling foam 4, a plurality of supporting wing ribs 5, two piezometer wing ribs, embedded piezometer tubes 7, and piezometer wires 8. The model steel joint 1 and the spar frame 2 are connected with the composite material skin 3. A structure of the spar frame 2 is in a form of two main beams and a single auxiliary beam. The piezometer ribs are arranged in the spare frame 2 and 12 supporting wing ribs 5. The embedded piezometer tubes 7 are arranged in the piezometer ribs. The lightweight filling foam 4 is arranged among the spare frame 2 and 12 supporting wing ribs 5. An outer surface of a frame segment formed by the lightweight filling foam 4, the 12 supporting wing ribs 5, piezometer wing ribs and the spar frame 2 is covered with the composite material skin 3. The frame segment and the composite material skin 3 are loaded on the model steel joint 1 to form the wing model for a static aeroelasticity wind tunnel test. A first piezometer wing rib 6 of the two piezometer wing ribs is respectively provided with 12 embedded piezometer tubes 7 on each of upper and lower surfaces of the wing (as shown in FIG. 2). A second piezometer wing rib 6 is provided with 10 embedded piezometer tubes 7 on each of the upper and lower surfaces of the wing (as shown in FIG. 3).

The embedded piezometer tubes 7 pass through piezometer holes reserved in the composite material skin 3 of the piezometer wing ribs, and are bonded to a lower surface of the composite material skin 3, and are connected to the piezometer wires 8. The piezometer wires 8 are led out from an inside of the wing model through wire holes reserved in the supporting wing ribs 5 and the lightweight filling foam 4. The composite material skin 3 is made from an aluminum mold processed by a Numerically Controlled Machine Tool. The piezometer wing ribs are located among the supporting wing ribs 5, and are made into segmented structures according to the spar frame 2. The embedded piezometer tubes 7 are loaded in the piezometer wing ribs for positioning wing sections and fixing piezometer tubes. The embedded piezometer tube 7 is loaded in the piezometer ribs for positioning wing sections and fixing piezometer tubes. A plurality of piezometer steel tubes of the embedded piezometer tubes 7 are arranged on the upper and lower surfaces of the wing to form a complete piezometer section. The embedded piezometer tubes 7 pass through piezometer holes reserved on the composite material skin, and are directly communicated with surroundings to measure an external pressure in real time. Directions of the piezometer holes are a normal direction of the piezometer section.

With above-mentioned technical solution, the piezometer tubes and the piezometer wing ribs are arranged at required piezometer sections. The piezometer tubes are embedded and bonded to a lower surface of the composite material skin and the piezometer wing ribs, and are connected to the piezometer lines. The piezometer wires are led out from the inside of the wing model through the wire holes reserved in the supporting wing ribs and the lightweight filling foam, which realizes an integrated function of force and pressure measurement of the static aeroelasticity wind tunnel test. The embedded piezometer tubes are communicated with the surroundings through the piezometer holes, instead of being exposed on the outer surface of the model. The piezometer wing ribs are located among the supporting wing ribs, and are made into segmented structures according to the spar frame, the segmented structures are adapted to the model structure. The wing model for a static aeroelasticity wind tunnel test has high-precision aerodynamic shape and high-strength loading capacity, and is capable of force and pressure measurement. The changes in the pressure distribution of the required wing section can be measured in real time during the wind tunnel test. The wing model realizes the integration of force and pressure measurement of the static aeroelasticity model, and obtain accurate aerodynamic data when the wing model is deformed under force.

What is claimed is:

1. A wing model for a static aeroelasticity wind tunnel test, comprising a model steel joint, a spar frame, a composite material skin, lightweight filling foam, a plurality of supporting wing ribs, two piezometer wing ribs, embedded piezometer tubes, and piezometer wires, wherein the model steel joint and the spar frame are connected with the composite material skin, the spar frame is of structure having two main beams and a single auxiliary beam, the piezometer wing ribs are arranged among the spar frame and the plurality of supporting wing ribs, the embedded piezometer tubes are arranged in the piezometer wing ribs, the lightweight filling foam is arranged among the spar frame and the plurality of supporting wing ribs, an outer surface of a frame segment formed by the lightweight filling foam, the plurality of supporting wing ribs, the piezometer wing ribs and the spar frame is covered with the composite material skin, and the frame segment is assembled on the model steel joint to form the wing model for the static aeroelasticity wind tunnel test.

2. The wing model for the static aeroelasticity wind tunnel test according to claim 1, wherein the embedded piezometer tubes pass through piezometer holes reserved in the composite material skin on the piezometer wing ribs, and are bonded to a lower surface of the composite material skin, and connected to the piezometer wires; the piezometer wires are led out from an inside of the wing model through wire holes reserved in the supporting wing ribs and the lightweight filling foam.

3. The wing model for the static aeroelasticity wind tunnel test according to claim 1, wherein the composite material skin is made from an aluminum mold processed by numerical control machining.

4. The wing model for the static aeroelasticity wind tunnel test according to claim 1, wherein the piezometer wing ribs are located among the supporting wing ribs, and formed into a segmented structure adapted to the spar frame.

5. The wing model for the static aeroelasticity wind tunnel test according to claim 1, wherein the embedded piezometer tubes are loaded in the piezometer wing ribs for positioning wing sections and fixing the embedded piezometer tubes.

6. The wing model for the static aeroelasticity wind tunnel test according to claim 1, wherein a plurality of piezometer steel tubes of the embedded piezometer tubes are arranged on upper and lower surfaces of the wing to form a complete piezometer section.

7. The wing model for the static aeroelasticity wind tunnel test according to claim 1, wherein the embedded piezometer tubes pass through piezometer holes reserved on the composite material skin, and are directly communicated with surroundings to measure an external pressure in real time, wherein the directions of the piezometer holes are a normal direction of the piezometer section.

* * * * *